United States Patent

Moan et al.

[11] 3,960,136
[45] June 1, 1976

[54] SOLAR ENERGY COLLECTION SYSTEM
[75] Inventors: Kenneth L. Moan; Yu Kun Pei, both of Toledo, Ohio
[73] Assignee: Owens-Illinois, Inc., Toledo, Ohio
[22] Filed: Feb. 20, 1975
[21] Appl. No.: 551,345

[52] U.S. Cl. ............................ 126/271; 237/1 A; 165/107; 126/270
[51] Int. Cl.² .......................................... F24J 3/02
[58] Field of Search ........... 126/270, 271; 237/1 A; 165/48, 107

[56] References Cited
UNITED STATES PATENTS

| | | | |
|---|---|---|---|
| 980,505 | 1/1911 | Emmet | 126/271 |
| 1,068,650 | 7/1913 | Harrison | 126/271 |
| 1,951,403 | 3/1934 | Goddard | 126/271 |
| 2,205,378 | 6/1940 | Abbot | 126/271 |
| 2,553,073 | 5/1951 | Barnett | 126/271 |
| 3,390,672 | 7/1968 | Snelling | 126/271 |

Primary Examiner—Kenneth W. Sprague
Assistant Examiner—James C. Yeung
Attorney, Agent, or Firm—Steve M. McLary; Edward J. Holler

[57] ABSTRACT

A system for the collection and utilization of solar energy. A manifold is mounted on the roof of a building with a major portion of the manifold being contained within the building. A plurality of double-walled, glass solar energy collector tubes are inserted into that part of the manifold which extends above the roof of the building. A gas, such as air, completely fills the manifold and collector tubes. The gas is circulated from the manifold to the ends of the collector tubes from whence it returns, having been heated during the movement. A heat exchanger mounted in the manifold has a working fluid, such as water, passing through it. The heated gas impinges on the heat exchanger, giving up much of its energy to the fluid passing through the heat exchanger. The working fluid is then used for space heating or cooling functions within the building.

6 Claims, 4 Drawing Figures

SOLAR ENERGY COLLECTION SYSTEM

BACKGROUND OF THE INVENTION

This invention generally relates to solar energy collectors. More specifically, this invention relates to solar energy collectors using double-walled glass tubes which are the major energy collection elements. Precisely, this invention relates to a solar energy collector of the type described which includes a heat exchanger in a gas filled manifold to allow use of air as an energy collection medium without requiring bulky air duct-work.

Most solar energy collectors of the prior art are of the flat plate type wherein air or water is circulated to absorb solar energy. Despite some advantages of flat plate collectors, glass, tubular collector arrays offer manufacturing and installation economies, In addition, air has seldom been used as the medium for extracting the solar energy from the collector array, whatever the type, for a number of reasons. If air is to be used to convey the solar energy elsewhere within a building for utilization, a bulky and expensive duct-work system is required. In addition, large volumes of air must be moved which require significant energy for pumping power. Flat plate collectors which use water for energy collection also have some deficiencies. The amount of water on the roof at any time is significant, thus creating a weight load factor problem. Water in such large quantities in a thin film is subject to freezing, unless anti-freeze solutions are used. A leak in such a system would liberate a large quantity of water on the roof where seepage into the structure could become a problem. In addition, these systems can seldom meet boiler codes, so the advantages inherent in operating at elevated pressures are not available. We have invented a solar energy collector which has a plurality of double-wall glass tubes connected to a manifold on the roof of a building. Air is circulated through the tubes and manifold to be heated by the sun. The pumping power and volume of air flow are relatively small. A heat exchanger carries water through the manifold. The water is heated by the circulating air. There is, therefore, only a small amount of water on the roof at any time, the heat exchanger can meet boiler codes, and the heated water may be transported within the building for utilization in relatively small water pipelines. Examples of the prior art may be seen in the following U.S. Pat. Nos. 1,242,511; 1,338,644; 2,342,211; 2,469,496; 2,601,905; 2,680,565; 2,933,885; and 3,799,145.

SUMMARY OF THE INVENTION

Our invention is a solar energy collector. The solar energy collector includes a manifold which is divided into at least a first and a second separate compartment. A tube connects the first compartment with the second compartment and extends beyond the second compartment into the outside atmosphere. A double-wall glass tube, the outer wall thereof being transparent about substantially its entire circumference, has the space between the double walls sealed at a sub-atmospheric pressure. The double-wall tube has a closed end and an open end which envelopes the connecting tube and which is in communication with the second compartment of the manifold. A gas fills the manifold, the connecting tube and the interior of the double-wall tube. A means is provided for propelling the gas, in an endless cycle, from one compartment, through the connecting tube, through the double-wall tube interior in counter flow to the original path through the connecting tube, and into the other compartment of the manifold. A heat exchanger is mounted in the path of flow of the gas from the second compartment into the first compartment.

DETAILED DESCRIPTION OF THE DRAWINGS

Figure 1:
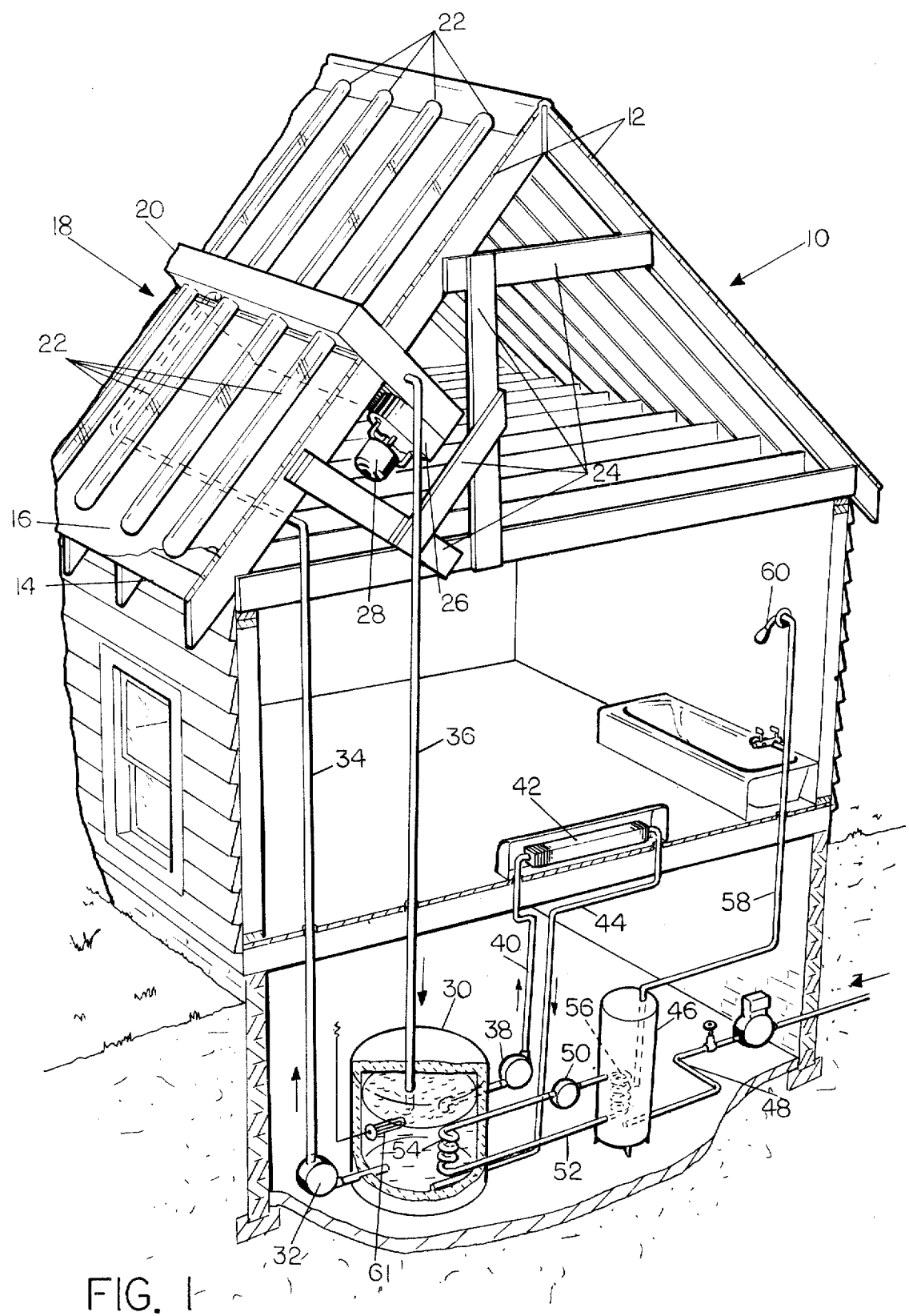
FIG. 1 is a perspective view, partially cut away, of a structure which utilizes the solar energy collector of the present invention.
Figure 2:
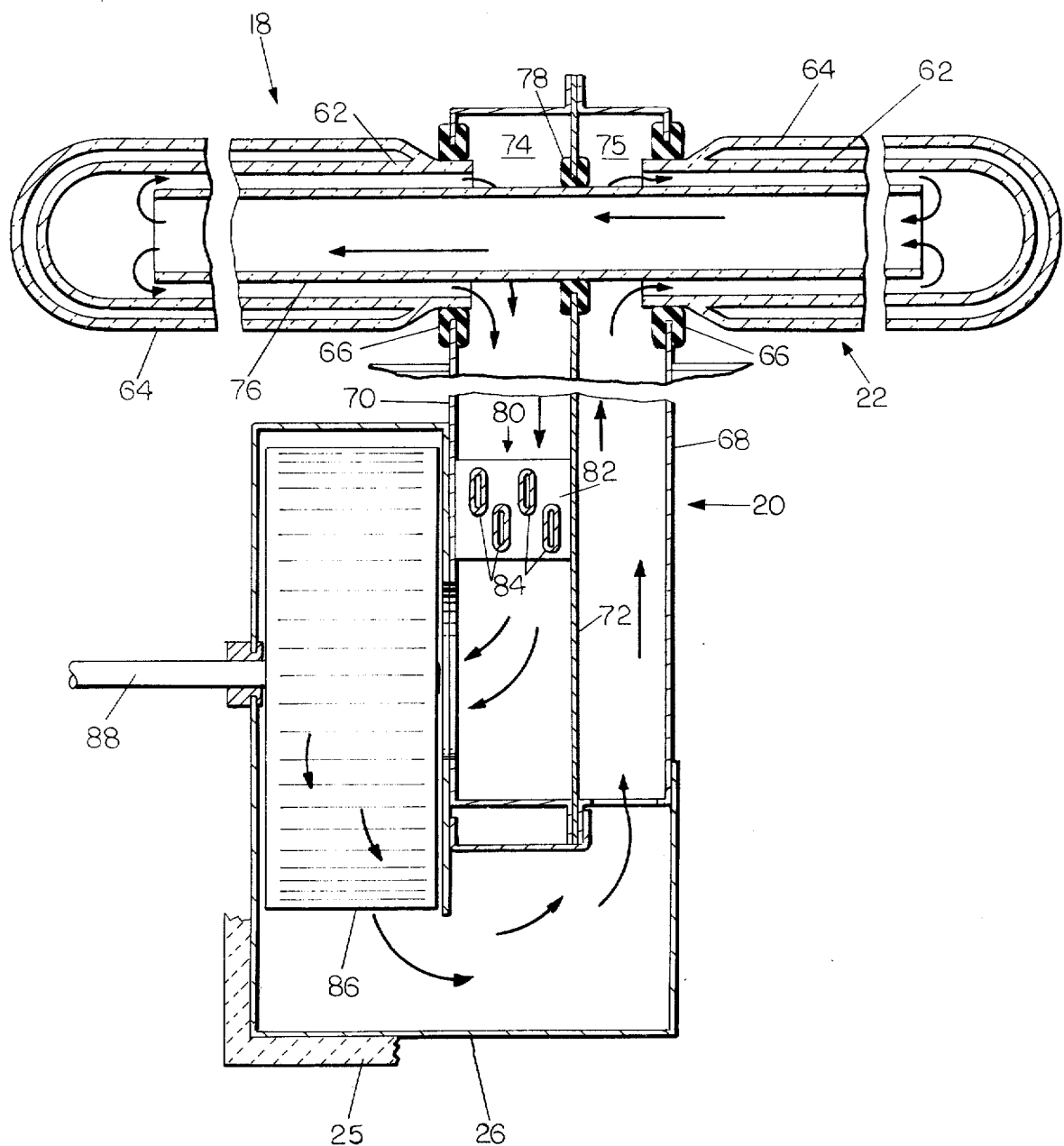
FIG. 2 is a side elevational view, in cross-section, of the solar energy collector of the present invention.

FIG. 1 illustrates a building 10, in this case a private residence, which is heated by the solar energy collection system of the present invention. The roof structure of the building 10 is formed as is conventional practice with a plurality of rafters 12. The rafters are then covered with roofing boards 14 and then covered with shingles 16. On one side of the roof, preferably facing in a southerly direction, is mounted a solar energy collector 18. The solar collector 18 includes a manifold 20 which is built into the roof structure and actually interrupts the rafters 12 on the side where the solar energy collector 18 is mounted. The manifold 20 is designed to be a structural member and a part of the roof, and as may be easily seen in FIG. 1 extends partially above the roof line or above the shingles 16 but has a major portion thereof extending into the attic portion of the building 10. The solar energy collector 18 also includes a plurality of collector tubes 22 which are carried by that portion of the manifold 20 which extends above the roof structure. While the manifold 20 is shown as mounted transversely to the roof structure, it could be mounted longitudinally between the rafters 12. A longitudinal mounting has the advantage of creating less shading effects between individual collector tubes 22 and of being less sensitive to seasonal variation in the declination of the sun. However, such a mounting orientation has the drawback of being sensitive to the cosine effect of direct solar radiation at low sun angles early and late in the day. On balance, the transverse mounting of the manifold 20 is preferred as affording maximum solar energy collection potential under a variety of sun orientation. The solar energy collector 18 is shown in greater detail in FIG. 2 and will be discussed further with respect to FIG. 2. Note that because of the interruption of the rafters 12 at the point where the manifold 20 is inserted, it is necessary to provide additional structural framing members for the roof. These framing members generally designated as 24 are simply shown as one illustrative technique of increasing the strength of the roof as required by breaking the rafters 12 on one side of the roof. The working fluid within the solar energy collector 18 is a gas, preferably air which thus avoids the problems of making the entire solar collector 18 completely gas-tight to avoid leakage of dangerous or expensive gases which could also be used as the working fluid. A blower housing 26 contains a blower or fan driven by a motor 28 to circulate air within the manifold 20. The heat exchange fluid which receives energy from the working fluid within the manifold 20 is preferably a liquid, such as water. The liquid is contained within a heavily insulated tank 30 which may be mounted in a convenient location of the building 10. The tank 30 is shown as being in the basement portion in FIG. 1, but could also be mounted in the attic or on the roof of such a building. Liquid to be heated is pumped from the lower portion of the tank 30 by a pump 32. This, of course, is done simply because the coolest liquid in the tank 30 will always be near the lower portion of the tank 30. The liquid so pumped passes through a pipeline 34 to one end of the manifold 20. Within the manifold 20, as will be shown in FIG. 2, is a heat exchanger which then allows the heated gas within the manifold 20 to pass its energy to the liquid flowing through the heat exchanger. After the liquid has been heated, it emerges from the manifold 20 in a pipeline 36 which then enters the top of the tank 30. Thus over a period of time, the liquid contained within the tank 30 may be circulated through the manifold 20 a number of times picking up heat energy during each passage. The temperature of the liquid within the tank 30 therefore begins to rise and may be held at a fairly high level on an average day with sunlight available to heat the gas contained within the solar energy collector 18. The heated liquid held within the tank 30 may be used for space heating purposes within the building 10. To illustrate this use, a single space-heating loop has been shown. The heated liquid is removed from the top of the tank 30 by a pump 38 and pumped upwardly through a pipeline 40 to a conventional radiator or heat exchanger 42. The heated liquid then gives off heat energy into the interior of the building 10 and the cooled liquid then returns through a pipeline 44 into the lower portion of the tank 30. The heated liquid within the tank 30 may also be used to furnish service hot water for use within the residence 10. A service hot water-holding tank 46 is furnished with water from the city water supply or from a private pump through an inlet pipeline 48. A pump 50 circulates a heat exchange medium, again preferably water, in a closed loop 52 between the tank 30 and the hot water tank 46. The pipe 52 has a plurality of coils 54 in the tank 30 and a corresponding plurality of coils 56 in the hot water tank 46. Thus the water contained within the hot water tank 46 will be heated over a period of time by the passage of the liquid contained in the closed loop pipeline 52 between the tank 30 and the hot water tank 46. The hot water within the tank 46 may then be used for general purposes within the residence 10, as illustrated by a pipeline 58 which is connected to a shower head 60. The tank 30 may have an auxiliary electrical heater 61 provided for periods when sunlight is not available.

Figure 3:
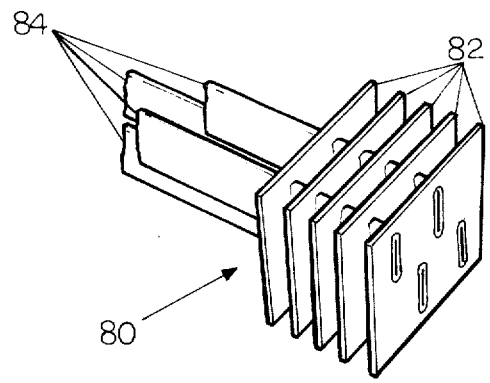
FIG. 3 is a perspective view of a portion of a typical heat exchanger configuration useable with the present invention.

FIG. 2 illustrates in a much more detailed form the precise configuration of the solar energy collector 18 of the present invention. One of the objections in the prior art to solar energy collectors which used air as an operational medium was the amount of power required to move the air. Air is a relatively inefficient heat exchange medium because of the large volumes required to transport significant quantities of heat. For this reason, the ductwork and the pumping power were relatively large. On the other hand, the drawbacks to water systems which use flat plate collectors or which had water on the roof was that such systems were subject to leakage, to freezing or to boiling if the temperature of the water reached too high a level. The solar energy collector 18 illustrated in FIG. 2 combines the best features of the water systems and the air systems to achieve an optimum result. The collector tubes 22 may be seen to be double-walled glass tubes. The inner and outer tubes 62 and 64 respectively of the collectors 22 are sealed together and the space between the tubes 62 and 64 is evacuated. This evacuated space acts as a very significant heat-transfer barrier and prevents loss of solar energy once collected within the collectors 22. As may be seen, the outer tube 64 terminates slightly before the open end of the collectors 22, and thus allows the inner tube 62 to be plugged into sealing engagement with gaskets 66 which are placed in openings formed in the manifold 20. Depending upon manufacturing considerations, either the inner tube 62 or the outer tube 64 may be plugged into the manifold 20. The manifold 20 is preferably made in three separate segments. There are two complementary U-shaped box members 68 and 70. The members 68 and 70 generally assume the configuration of a closed box with an open top. In assembly, the two open sides of the members 68 and 70 are placed together to form a completely closed structure. Before this is done, however, a center divider 72 is placed in position and is secured to thereby form two separate compartments 74 and 75. Since the manifold 20 has no water flowing directly through it, the manifold 20 could be made of a foamed plastic insulating material. One of the collector tubes 22 is plugged into the compartment 74 while on the opposite side another collector tube 22 is plugged into the compartment 75. This arrangement obtains throughout the entire length of the solar energy collector 18 as is best seen in FIG. 1. Thus there are a plurality of collector tubes 22 in communication with the compartment 74 and a corresponding plurality of collector tubes 22 in communication with the compartment 75. The manifold 20 and blower housing 26 have all of their exposed surfaces covered with an insulating material 25. This material 25 is shown on only a portion of these surfaces in FIG. 2 to avoid undue complication. The insulating material 25 keeps heat losses from the manifold 20 to a minimum. A relatively long connector tube 76 is engaged in a gasket 78 which is placed in an opening in the center divider 72. The opening in the center divider 72 in which the gasket 78 is placed, is completely sealed by the outer walls of the connector tube 76. The connector tube 76 as was noted is a relatively long tube and extends outwardly almost to the end of the collector tubes 22 which connect both the compartment 74 and the compartment 75. Thus the collector tubes 22 are paired in the sense that one tube 22 is in communication with the compartment 74 while an opposite tube 22 is in communication with the compartment 75. The connector tube 76 then extends nearly the full length of both of these tubes. There is, therefore, a path available for air within the manifold 20 which allows air to pass from the compartment 74 to the compartment 75 by flowing through the connector tube 76. The connector tube 76 is shown in FIG. 2 as being a glass tube, but the material of this particular tube is not especially critical. However, it is preferable that one wall of the inner tube 62 be coated with a black or sun-absorbing coating so that the sunlight falling upon the inner tube 62 through the transparent outer tube 64 will heat the inner tube 62, thus extracting solar energy. A heat exchanger 80 is positioned within the compartment 74 and completely fills the compartment 74 so that any air passing downwardly in the compartment 74 must pass through the heat exchanger 80. A particular configuration of a heat exchanger that is preferred is shown in a perspective view in FIG. 3. The heat exchanger 80 preferably has a plurality of flat plates 82 attached to a plurality of elliptical pipes 84 through which the fluid contained within the tank 30 is pumped. If desired, the pipes 84 may be round. Because the liquid system is actually isolated from the solar energy collection system, the liquid system may be designed to meet boiler codes, thereby allowing operation of a pressurized liquid system. This is a significant advantage since flat plate collectors and the tubular glass collectors 22 of this invention usually cannot meet such code requirements. The fluid is introduced into and removed from the plurality of pipes 84 through inlet and outlet headers at either end of the manifold 20. Thus, as heated air flows over the plates 82, the plates 82 become heated and transfer this energy into the fluid contained within the pipes 84. Additionally, the same heated air can directly impact on the pipes 84 and impart heat directly by such direct contact. Because the bulk of the manifold 20, and in particular the heat exchanger 80 through which water flows, is below the roof in the attic of the building 10, the danger of freezing the water is substantially reduced if not completely eliminated. A blower wheel or rotary air circulation means 86 is contained within the blower housing 26, and is driven by a shaft 88 that is powered by the motor 28. The operation of the solar energy collector 18 shown in FIG. 2 may be briefly explained as follows: Air is pulled out of the compartment 74, through an opening formed in the wall of the compartment 74, by the rotating blower wheel 86. This air then is passed through the lower portion of the blower housing 26 and is forced into the compartment 75 through an opening in the bottom of the compartment 75. By virtue of the pressure differential behind this air, the air is forced outwardly to the end of the inner tube 62 connected into the compartment 75 and then into and through the cross-connector tube 76. At the end of the cross-connector tube 76, the air exits into the inner tube 62 which is in communication with compartment 74 and flows down along the inner tube 62 and into the compartment 74. This air then flows through the heat exchanger 80 and is again pulled into the blower housing 26 by the rotating blower wheel 86. The length of the collectors 22 is calculated such that as the air that is being circulated in this pattern passes through the collectors 22 and down the connector tube 76, the air experiences an appreciable rise in temperature. Thus the air which impacts upon the heat exchanger 80 is considerably hotter than the air which enters into the inner tube 62 connected to the compartment 75. The air which has been heated gives up a significant portion of its energy to the heat exchanger 80 thereby heating the fluid flowing through the elliptical tubes 84. This cycle is continuously repeated with the fluid that is circulated from the tank 30 becoming hotter and hotter as it makes multiple passes through the heat exchanger 80.

Figure 4:
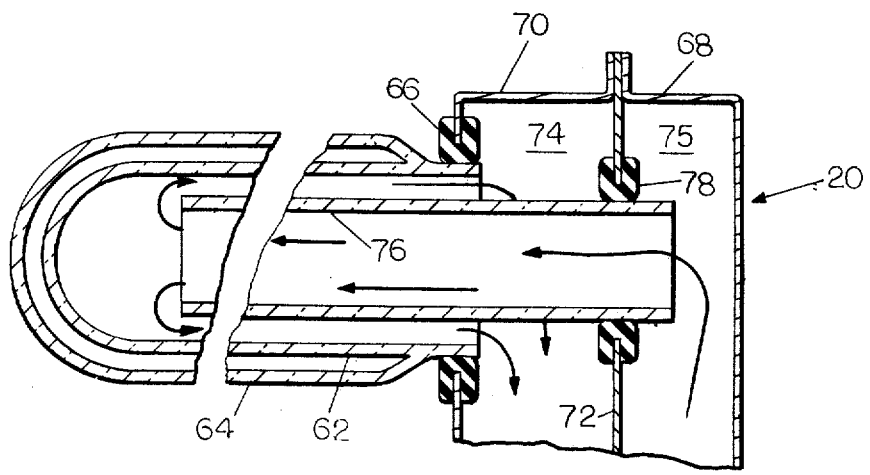
FIG. 4 is a side elevational view, in cross-section of a modification of the solar energy collector shown in FIG. 2.

The availability of roof space for installation or the shape of a roof may dictate an array configuration somewhat different from that shown in FIG. 1. For example, it may be possible to operate this system with a plurality of collector tubes 22 extending from only one of the compartments 74 and 75. An example of such a collector is shown in FIG. 4. The operation of the collector unit would be identical to that shown in FIG. 2, so the view of FIG. 4 is a fragmentary view which shows the modification necessary to make the collector array suitable for such use. All that is necessary to make this modification is the elimination of the collector tubes 22 which would normally be connected into the compartment 75. Additionally, the connector tube 76 is shortened since it no longer needs extend beyond the compartment 75. The numbering of FIG. 4 for identical components is the same as that shown in FIG. 2. Thus it may be seen that the air circulation pattern would be through the blower wheel 86 into the compartment 75 and thence down the connector tube 76 and out along the inner tube 62 into the compartment 74. The air would then pass over the heat exchanger 80 and again be pulled in by the rotating blower wheel 86. It may be seen that the modification shown in FIG. 4 results in a reduction to approximately one-half of the total area available for the collection of solar energy as compared with the array shown in FIG. 1. However, the longitudinal extent of the entire array might be extended in such a case to result in no net loss of available collector area.

What we claim is:

1. A solar energy collector which comprises:
    a manifold divided into at least a first and a second separate compartment;
    a connecting tube extending through said first and said second compartments, said connecting tube extending beyond both said first and said second compartments into the outside atmosphere;
    a first double wall transparent glass tube, the space between said double walls being sealed at a sub-atmospheric pressure, having a closed end, and an open end enveloping that portion of said connecting tube extending beyond said second compartment and in communication with said second compartment;
    a second double wall transparent glass tube, the space between said double walls being sealed at a sub-atmospheric pressure, having a closed end, and an open end enveloping that portion of said connecting tube extending beyond said first compartment and in communication with said first compartment;
    a gas, filling said manifold, connecting tube and said first and second double wall tubes;
    means for propelling said gas in an endless cycle from one compartment to the other, through said connecting tube, through both of said first and second double wall tubes in counter flow to the path of flow through said connecting tube and into the other compartment of said manifold; and
    a heat exchanger, mounted in the path of flow of said gas from said second compartment to said first compartment.

2. The solar energy collector of claim 1 wherein said means for propelling said gas includes:
    a blower housing connected to said manifold and having openings into said first and second compartments;
    a rotary gas circulation means mounted in said blower housing for moving gas from said second compartment to said first compartment; and
    means for driving said rotary gas circulation means.

3. The solar energy collector of claim 1 which further includes:
    a layer of a heat insulating material surrounding all exposed surfaces of said manifold.

4. The solar energy collector of claim 1 which further includes:

an energy-absorbing, opaque coating covering substantially an entire surface of the inner wall of each of said double wall glass tubes.

5. A solar energy collection system for a building, which includes a roof portion, which comprises, in combination:

a manifold, mounted on said roof portion and having at least part of said manifold extending above said roof portion and part of said manifold within said building below said roof portion, said manifold being divided into at least a first and a second separate compartment;

a connecting tube extending through said first and said second compartments, said connecting tube extending beyond both said first and said second compartments and overlying a part of said roof portion in the outside atmosphere;

a first double wall transparent glass tube, the space between said double walls being sealed at a sub-atmospheric pressure, having a closed end, and an open end enveloping that portion of said connecting tube extending beyond said second compartment and in communication with said second compartment;

A second double wall transparent glass tube, the space between said double walls being sealed at a sub-atmospheric pressure, having a closed end, and an open end enveloping that portion of said connecting tube extending beyond said first compartment and in communication with said first compartment;

a gas, filling said manifold, connecting tube and said first and second double wall tubes;

means for propelling said gas in an endless cycle from one compartment to the other, through said connecting tube, through both of said first and second double wall tubes in counter flow to the path of flow through said connecting tube and into the other compartment of said manifold;

a heat exchanger, mounted in the path of flow of said gas from said second compartment to said first compartment;

a fluid for circulation through said heat exchanger;

means for storing said fluid within said building; and means for moving said fluid to and from said heat exchanger from said storage means.

6. The solar energy collection system of claim 5 which further includes:

an energy-absorbing, opaque coating covering substantially an entire surface of the inner wall of each of said double wall glass tubes.

* * * * *